United States Patent
Chu et al.

(10) Patent No.: US 7,693,736 B1
(45) Date of Patent: Apr. 6, 2010

(54) RECURRING MEETING SCHEDULE WIZARD

(75) Inventors: Christopher Chu, Lakewood, CO (US); Brijen Doshi, Thornton, CO (US); D. Michael Overmyer, Golden, CO (US); Dongliang Wang, Thornton, CO (US)

(73) Assignee: Avaya Inc., Basking Ridge, NJ (US)

(*) Notice: Subject to any disclaimer, the term of this patent is extended or adjusted under 35 U.S.C. 154(b) by 358 days.

(21) Appl. No.: 11/554,497

(22) Filed: Oct. 30, 2006

(51) Int. Cl.
  *G06F 9/46* (2006.01)
(52) U.S. Cl. .................. 705/9; 705/8; 705/7; 707/101; 707/102
(58) Field of Classification Search ........................ None
  See application file for complete search history.

(56) References Cited

U.S. PATENT DOCUMENTS

| | | | |
|---|---|---|---|
| 4,819,191 A | 4/1989 | Scully et al. | |
| 4,831,552 A | 5/1989 | Scully et al. | |
| 5,050,077 A * | 9/1991 | Vincent | 705/8 |
| 5,124,912 A * | 6/1992 | Hotaling et al. | 705/9 |
| 5,197,000 A * | 3/1993 | Vincent | 705/8 |
| 5,206,903 A | 4/1993 | Kohler et al. | |
| 5,216,603 A | 6/1993 | Flores et al. | |
| 5,323,314 A | 6/1994 | Baber et al. | |
| 5,428,784 A | 6/1995 | Cahill, Jr. | |
| 5,555,346 A | 9/1996 | Gross et al. | |
| 5,619,555 A | 4/1997 | Fenton et al. | |
| 5,627,978 A | 5/1997 | Altom et al. | |
| 5,793,365 A | 8/1998 | Tang et al. | |
| 5,813,013 A * | 9/1998 | Shakib et al. | 707/102 |
| 5,828,747 A | 10/1998 | Fisher et al. | |
| 5,889,945 A | 3/1999 | Porter et al. | |
| 5,893,073 A * | 4/1999 | Kasso et al. | 705/8 |
| 5,905,793 A | 5/1999 | Flockhart et al. | |
| 5,920,701 A | 7/1999 | Miller et al. | |
| 5,982,873 A | 11/1999 | Flockhart et al. | |
| 6,064,976 A | 5/2000 | Tolopka | |
| 6,085,166 A * | 7/2000 | Beckhardt et al. | 705/9 |
| 6,101,480 A * | 8/2000 | Conmy et al. | 705/9 |
| 6,147,685 A | 11/2000 | Bliss et al. | |

(Continued)

FOREIGN PATENT DOCUMENTS

EP 1014286 6/2000

(Continued)

OTHER PUBLICATIONS

Windows Client User Guide (Novell Groupwise 7.0, Mar. 14, 2008, copyright 2005-2008).*

(Continued)

*Primary Examiner*—Scott L Jarrett
*Assistant Examiner*—Alan Miller
(74) *Attorney, Agent, or Firm*—Sheridan Ross P.C.

(57) ABSTRACT

The present invention provides methods and systems for scheduling recurring calendar items. More specifically, a recurring meeting may be scheduled between participants where the recurring meeting includes at least two different meetings that are set to occur at two different times with a determined periodicity. Allowable dates and times for the recurring meeting can be scheduled based on a number of criteria defined such as the availability of the participants for all meeting times and the availability of participants for certain meeting times.

23 Claims, 8 Drawing Sheets

U.S. PATENT DOCUMENTS

| | | | |
|---|---|---|---|
| 6,163,607 | A | 12/2000 | Bogart et al. |
| 6,173,053 | B1 | 1/2001 | Bogart et al. |
| 6,192,111 | B1 | 2/2001 | Wu |
| 6,192,122 | B1 | 2/2001 | Flockhart et al. |
| 6,272,074 | B1* | 8/2001 | Winner .................. 368/10 |
| 6,360,217 | B1* | 3/2002 | Gopal et al. .............. 707/3 |
| 6,363,352 | B1 | 3/2002 | Dailey et al. |
| 6,370,566 | B2* | 4/2002 | Discolo et al. .......... 709/206 |
| 6,377,965 | B1 | 4/2002 | Hachamovitch et al. |
| 6,434,571 | B1 | 8/2002 | Nolte |
| 6,570,555 | B1 | 5/2003 | Prevost et al. |
| 6,594,637 | B1* | 7/2003 | Furukawa et al. ........... 705/9 |
| 6,640,230 | B1 | 10/2003 | Alexander et al. |
| 6,662,309 | B2 | 12/2003 | Ando et al. |
| 6,675,356 | B1 | 1/2004 | Adler et al. |
| 6,731,323 | B2 | 5/2004 | Doss et al. |
| 6,988,128 | B1 | 1/2006 | Alexander et al. |
| 7,007,235 | B1 | 2/2006 | Hussein et al. |
| 7,016,909 | B2* | 3/2006 | Chan et al. ............. 707/101 |
| 7,035,865 | B2 | 4/2006 | Doss et al. |
| 7,082,402 | B2* | 7/2006 | Conmy et al. ............. 705/8 |
| 7,113,797 | B2* | 9/2006 | Kelley et al. .......... 455/456.2 |
| 7,130,885 | B2 | 10/2006 | Chandra et al. |
| 7,187,384 | B2* | 3/2007 | Noyle .................. 345/522 |
| 7,188,073 | B1 | 3/2007 | Tam et al. |
| 7,254,569 | B2 | 8/2007 | Goodman et al. |
| 7,343,312 | B2* | 3/2008 | Capek et al. ............. 705/8 |
| 7,343,313 | B2* | 3/2008 | Dorenbosch et al. ......... 705/8 |
| 7,363,590 | B2 | 4/2008 | Kerr et al. |
| 7,383,303 | B1 | 6/2008 | Bort |
| 7,395,221 | B2* | 7/2008 | Doss et al. .............. 705/9 |
| 7,436,654 | B2 | 10/2008 | Cho |
| 7,440,961 | B1* | 10/2008 | Matousek ............... 707/101 |
| 7,519,672 | B2 | 4/2009 | Boss et al. |
| 2001/0054072 | A1 | 12/2001 | Discolo et al. |
| 2002/0085701 | A1 | 7/2002 | Parsons et al. |
| 2002/0117847 | A1* | 8/2002 | Ede et al. ............... 283/78 |
| 2002/0120600 | A1 | 8/2002 | Schiavone et al. |
| 2002/0144136 | A1 | 10/2002 | Stornetta et al. |
| 2003/0149606 | A1 | 8/2003 | Cragun et al. |
| 2003/0154293 | A1 | 8/2003 | Zmolek |
| 2003/0163537 | A1 | 8/2003 | Rohall et al. |
| 2003/0204474 | A1* | 10/2003 | Capek et al. ............. 705/64 |
| 2004/0054726 | A1 | 3/2004 | Doss et al. |
| 2004/0128181 | A1 | 7/2004 | Zurko et al. |
| 2004/0199663 | A1 | 10/2004 | Horvitz et al. |
| 2004/0254998 | A1 | 12/2004 | Horvitz |
| 2005/0069099 | A1 | 3/2005 | Kozdon et al. |
| 2005/0125246 | A1 | 6/2005 | Muller et al. |
| 2005/0125248 | A1 | 6/2005 | Butterworth et al. |
| 2005/0165631 | A1 | 7/2005 | Horvitz |
| 2005/0192857 | A1* | 9/2005 | Levine .................. 705/8 |
| 2005/0198144 | A1 | 9/2005 | Kraenzel et al. |
| 2006/0004843 | A1 | 1/2006 | Tafoya et al. |
| 2006/0020889 | A1* | 1/2006 | Coppinger et al. ......... 715/710 |
| 2006/0031326 | A1 | 2/2006 | Ovenden |
| 2006/0031470 | A1 | 2/2006 | Chen et al. |
| 2006/0047557 | A1 | 3/2006 | Bieselin et al. |
| 2006/0069686 | A1* | 3/2006 | Beyda et al. ............. 707/10 |
| 2006/0184584 | A1 | 8/2006 | Dunn et al. |
| 2006/0242109 | A1 | 10/2006 | Pereira et al. |
| 2007/0118415 | A1* | 5/2007 | Chen et al. .............. 705/8 |
| 2007/0174104 | A1 | 7/2007 | O'Sullivan et al. |
| 2007/0265903 | A1 | 11/2007 | Blair et al. |
| 2008/0005685 | A1 | 1/2008 | Drews et al. |
| 2008/0034425 | A1 | 2/2008 | Overcash et al. |
| 2008/0037733 | A1 | 2/2008 | Chen et al. |

FOREIGN PATENT DOCUMENTS

| | | |
|---|---|---|
| EP | 1560138 | 8/2005 |
| WO | WO 2005/010715 | 2/2005 |

OTHER PUBLICATIONS

Special Edition Using Lotus Notes and Domino 5 (Published by Que, Aug. 23, 1999, ISBN 0-7897-1814-6).*

AVANTGO: AvantGo launches new release of Pylon products; AvantGo Pylon 5.1 offers new support for Domino 6, Palm OS 5 and custom repeating meetings M2 Presswire. Coventry: Jan. 24, 2003. p. 1.*

U.S. Appl. No. 10/770,640, filed Feb. 2, 2004, Mohler.

"Avaya™ Unified Communication Center (UCC) Speech Access Solution", Avaya, Inc. (2002), 4 pages.

"How To Use A TTY", NETAC Teacher Tipsheet, htt://72.14.203.104/search?q=cache:JdktLkxPgMUJ:www.netac.rit.edu/downloads/TPSHT_TTY.pdf+%22teletypewriter%22+... (1999) 4 pages.

U.S. Appl. No. 11/350,050, filed Feb. 7, 2006, Atkins et al.

U.S. Appl. No. 11/488,487, filed Jul. 17, 2006, Daily et al.

U.S. Appl. No. 11/554,442, filed Oct. 30, 2006, Atkins et al.

U.S. Appl. No. 11/554,478, filed Oct. 30, 2006, Atkins et al.

U.S. Appl. No. 11/619,145, filed Jan. 2, 2007, Atkins et al.

U.S. Appl. No. 11/669,707, filed Jan. 31, 2007, Blair et al.

"Meetings in America", MCI Conferencing, available at http://e-meetings.mci.com/meetingsinamerica/uswhitepaper.php3, website updated Aug. 19, 2003, pp. 1-12.

"TTY Brochure Feb. 2006", http://72.14.203.104/search?q=cache:O3tW0eQtbTEF:ods.utk.edu/brochures/TTYBrochureFebruary2006.pdf+%22teletypewrite ... (Feb. 2006) 3 page.

"WebAccess Client User Guide" Novell GroupWise 6.5, Oct. 31, 2005, 68 pages.

AIM Acronym Dictionary, http://www.aim.com/acronyms.adp (Jan. 16, 2007) 7 pages.

AIM Bots, http://developer.aim.com/botMain.jsp (2006) 2 pages.

AIM Buddy Info, http://buddyinfo.aim.com/ (2006) 2 pages.

AIM Presence Services, http://developer.aim.com/presenceMain.jsp (2006) 2 pages.

Arthur M. Rosenberg and David A. Zimmer, "Beyond VoIP: Enterprise Perspectives On Migrating To Multi-Modal Communications And Wireless Mobility", (Oct. 2004) 38 pages.

Arthur M. Rosenberg and David A. Zimmer, "Migrating To Enterprise-Wide Communications: The Branch Office Dilemma", May 2003, 14 pages.

Avaya By Example; Three-Week Wonder: Avaya Unified Communication Center Speech Access Gives Road Warriors 15 Additional Days Each Year, Avaya, Inc. (2005) 3 page.

Boyce, "Microsoft Office Outlook 2003 Inside Out," Nov. 5, 2003, Microsoft Press, Chapters 1, 19, 20.

Chapters 4, 5 and 7 from Microsoft® Office Outlook® 2003; "Step by Step"; Online Training Solutions, Inc.

Dave Anderson and George McNeill, "Artificial Neural Networks Technology", http://www.dacs.dtic.mil/techs/dacs_reports/text/neural_nets.txt (Aug. 20, 1992) 145 pages.

Dey et al., CybreMinder: A Context-Aware System for Supporting Reminders, Handheld and Ubiquitous Computing: Second International Symposium, HUC 2000, Bristol, UK, September 2000. Proceedings, Jul. 31, 2003, 15 pages, vol. 1927/2000, Springer Berlin/Heidelberg.

"Microsoft Outlook" http://en.wikipedia.org/wiki/Microsoft_Outlook; printed Mar. 14, 2006; 4 pages.

"FreeBusy—Microsoft Outlook email autoresponder" http://freebusy.4team.biz/; printed May 24, 2006; 4 pages.

"Microsoft Outlook in Your Small Business" http://www.bcentral.co.uk/products/microsoft-outlook.mspx; printed Mar. 14, 2006; 2 pages.

http://www.effectivemeetings.com (SMART Technologies, Inc., May 2003).

IVTTA Turin 98, "The Linguistic Components Of The Reward Dialogue Creation Environment And Run Time System", http://cpk.auc.dk/~tb/articles/ivtta98.htm (Sep. 1998) 13 pages.

Rob Kassel, "How Speech Recognition Works", http://www.microsoft.com/speech/docs/How_Speech_Works_Article.htm (Nov. 30, 2004) 4 pages.

Tony Vitale, "Hardware And Software Aspects Of A Speech Synthesizer Developed For Persons With Disabilities", http://codi.buffalo.edu/archives/computing/.dec.speech (1993).

Yin "[Design] linking and grouping items", available at http://lists.osafoundation.org/pipermail/design/2005-August/003159.html Aug. 1, 2005, pp. 1-2.

Background of the above-captioned application (previously provided).

Avaya Case Study (Advertising Agency Uses Avaya Unified Messenger to Streamline Communications, 2003 Avaya Inc.), 2 pages.

U.S. Appl. No. 12/570,933, filed Sep. 30, 2009, Mohler.

Avaya Press Release (Avaya Introduces IBM Lotus Domino Version of Its Market-Leading Unified Messaging Software, http://www.avaya.com/usa/Error404.aspx?currentpath=master-usa/en-us/corporate/pressroom/pressreleases/2003/pr-03,Jan. 27, 2003), 4 pages.

Avaya Unified Messenger Client User Guide (2002 Avaya Inc.) Avaya Web Pages (Retrieved Archive.org from Jun. 13, 2004), 167 pages.

Avaya Unified Messenger Solution—Microsoft Exange 2000 version Installation Guide (2002 Avaya Inc.) 164 pages.

Avaya Unified Messenger Solution—Microsoft Exange Version, 2000 version (2002 Avaya Inc), 8 pages.

Clayton, Brad "Microsoft Outlook 2003 Enhancements", modified Apr. 19, 2004, Purdue University, 4 pages.

Online Training Solutions, Inc., "Step by Step," Microsoft Outlook 2003, pp. 1-119, USA.

Online Training Solutions, Inc., "Step by Step," Microsoft Outlook 2003, pp. 120-225, USA.

Online Training Solutions, Inc., "Step by Step," Microsoft Outlook 2003, pp. 226-334, USA.

\* cited by examiner

RECURRING MEETING SCHEDULE WIZARD

FIELD OF THE INVENTION

The invention relates generally to calendars and scheduling applications. More particularly, the invention relates to the scheduling of recurring meetings.

BACKGROUND

Electronic mail has become a widely used business communication and organization application. The use of email has proliferated well beyond the simple act of sending and receiving messages. Email is currently used as a platform for meeting coordination and resource sharing. Additionally, applications like electronic calendars and planners are widely used alone and with email. There are a number and variety of interactive electronic calendaring systems and methods currently available to email users. The objective of all of these systems is primarily to assist the person who, for a number of different reasons, maintains a calendar of future events containing various information about the events at entry points on the calendar, which relate to the time of the event. The events (or calendar items) have a number of different parameters (e.g., location, time, resources, attendees, invitees, etc.) that help define the event.

The increased availability and usefulness of personal computers, Personal Digital Assistants (PDAs) and intelligent workstations in recent years has made it possible for calendar owners to establish and maintain these calendars on these interactive type data processing systems. Hence, the term "electronic calendaring systems." Electronic calendaring systems are also referred to sometimes as calendar applications.

Calendar applications can be used to schedule meetings or other types of calendar items with other participants. An invitation for the meeting is usually sent to the invited participants (invitees) via email or some other known communication modality. The invited parties can then decide if the proposed meeting time works for them. Often with a large number of invitees there will be at least one invitee that cannot make the meeting due to a prior commitment. At this point the invitee can respond to the invitation and tell the meeting originator that he/she cannot make that meeting. The originator then has to decide whether to continue with the meeting as planned without the invitee or to reschedule the meeting to accommodate for the invitee. If the originator decides to reschedule the meeting there is a likelihood that the new meeting time will conflict with another invitee's schedule. Thus, this process of negotiating a meeting time can be very cumbersome and time consuming. The process can become even more complicated in the event that the originator is attempting to schedule a recurring meeting (e.g., a weekly meeting for the same participants). Recurring meetings are very common in the business world as it provides a time for a certain number of people to know they will meet regularly to discuss various important issues.

Today, most calendar applications provide assistance in scheduling a single occurrence meeting. This is made possible when all potential invitees to a meeting make their schedule publicly available. This way a potential meeting originator is able to know, a priori, what times will likely work and not work for potential invitees based on their published schedule. When attempting to schedule a single occurrence meeting, some calendar applications can compare the availability of all invitees to determine what earliest time is available for the entire population of participants (i.e., originator and invitees). This earliest time is suggested to the originator who can ultimately determine whether the suggested time will work for the meeting.

Although calendar applications can assist an originator in scheduling a single occurrence meeting, there is no solution currently known that assists an originator in scheduling a recurring meeting. The difficulty with scheduling a recurring meeting is typically not scheduling a first in the set of the recurring meetings. The difficulty is in scheduling the meetings that succeed the first meeting. Recurring meetings generally have a predefined periodicity requirement (e.g., weekly, bi-weekly, monthly, etc.). It is quite difficult to schedule multiple meetings with a predefined periodicity requirement for multiple participants. It becomes even more difficult to schedule such a meeting if some or all of the participants are relatively busy people that have a number of other previous commitments. The typical approach used today when scheduling a recurring meeting is to manually look out a few weeks in all of the participants' schedules to look for common availabilities between all participants. A time is chosen for that week, then the originator has to look out to the next period (e.g., the following week) for each participant to see if the chosen time will work in the following week. This process is continued for as long as the recurring meeting is desired to last. If the originator gets to say the third period and determines that the first chosen meeting time will not work in the third week, then the originator must go back to the first week to choose an alternative time for the first meeting. After an alternative time is chosen the originator repeats the steps of checking each successive period to see if the chosen time will work in each period for all participants. This particular scheduling approach is very time consuming and prone to errors. Moreover, manually choosing a meeting time that works for a large group of invitees and/or relatively busy invitees can be very difficult if not impossible. Specifically, there may not be any one meeting time during each period (e.g., every Wednesday at 3:00 pm) that will work for all participants.

SUMMARY

These and other needs are addressed by various embodiments and configurations of the present invention. The present invention is directed generally to the management and scheduling of recurring meetings. More specifically, recurring meetings between participants are scheduled based on one or more aspects of each participant's long-term schedule.

In accordance with one embodiment of the present invention, a method is provided for managing a schedule. The method comprises the steps of:

(a) identifying participants of a recurring meeting, e.g., the recurring meeting includes first, second, third, up to an Nth meeting;

(b) determining a desired periodicity of the recurring meeting;

(c) defining a minimum required availability criteria for the participants in association with the recurring meeting;

(d) analyzing a schedule of each participant included in the identified participants; and (e) identifying a recurring time that meets the minimum required availability criteria and substantially meets the desired periodicity.

As used herein a "meeting" is understood to include a temporally scheduled to-do item including, without limitation, actual meetings or requests thereof, events, commitments, and tasks. A meeting is generally used as a coordination of activities between two or more individuals, but may alternatively be used as a task for one's self. Therefore, a recurring meeting is an event, task, and/or commitment that is scheduled to occur more than once. In one embodiment, a weekly, bi-weekly, or monthly meeting can be considered a recurring meeting. The meeting may be preferably set to include the same participants over its periodicity.

The periodicity of a recurring meeting can vary depending upon the nature of the recurring meeting. Additionally, the use of the term periodicity and periodic is not limited to exact periodic meetings (e.g., meetings that occur every Tuesday at 1:30 pm). Rather, as used herein, the "periodicity" of a recurring meeting can include slight alterations to a desired periodicity. For example, if the desired periodicity of a recurring meeting is every week, then a recurring meeting can be scheduled once a week but each week's meeting does not necessarily need to occur at the exact same time every week. Rather, based on a defined threshold (e.g., must be on the same day, same hour, or just in the same week) the periodicity of the recurring meeting can vary from week to week. So, for example, a first week's meeting may occur on Tuesday at 1:30 pm and the following week's meeting may occur on Tuesday at 3:00 pm. This particular situation would satisfy both a same day threshold and same week threshold. However, this situation does not satisfy a same hour threshold. Thus, the periodicity of a recurring meeting as used herein should be understood to include both uniform and non-uniform spacing between meetings in the recurring meeting. When the threshold allows exceptions for people to miss one or more meetings, then the use may be provided with an exception management tool that may allow the thresholds to be adjusted for a certain day if necessary. In other words a threshold may only be required to apply to N of M total meetings.

In one embodiment, the long-term schedules of participants can be analyzed, either by a person or by a scheduling wizard, to determine when a recurring meeting should be scheduled. By analyzing the schedule of each participant and allowing a certain amount of flexibility in determining what times will work for the recurring meeting, one or more suitable recurring meeting times can be determined. If more than one recurring meeting time satisfies the conditions or criteria that define an allowable recurring meeting time, then the possible recurring meeting times can be further ranked based upon availability statistics computed for each possible recurring meeting time. Availability statistics, in one embodiment, provide a convenient way of summarizing a participant's long-term schedule. The availability statistics can either be used by the calendar application to determine the best recurring meeting time or may be provided to the originator of the recurring meeting to help assist them in deciding when the recurring meeting should be scheduled.

In one embodiment, each participant's schedule can be displayed to a recurring meeting organizer in such a way as to allow the organizer to pick a recurring meeting time with relative ease. In an alternative embodiment, a scheduling wizard may be employed to automatically pick a recurring meeting time or at least suggest possible recurring meeting times. In other embodiments, a scheduling wizard may be used initially and the final decision may be made by the meeting organizer regarding the recurring meeting time.

The benefits of employing a recurring meeting manager are expansive. For example, recurring meetings can be scheduled more efficiently and easily. There could also be cost and timesavings in planning recurring meetings. Moreover, invitee attendance can be optimized thus facilitating more productive meetings and subsequent decisions. Schedule data can be presented to a meeting planner in a form that is both easily useable and helpful.

The desired length of recurring meeting can be used by either the person or a scheduling wizard to determine when a particular recurring meeting should be scheduled. As used herein "length" of a meeting is understood to include one or both of the duration of each meeting in the recurring meeting as well as the interval of the entire recurring meeting. The interval along with the requested periodicity can be used to calculate how many meetings are desired and the duration of each meeting can be used to analyze the availability of each participant.

In one embodiment, participants are grouped into classes. Each class may have a different attendance requirement. For example, one class of participants may be required to attend every meeting in the recurring meeting whereas another class of participants may be required only to attend a subset of the meetings. By classifying participants a user or scheduling wizard will be more likely to find acceptable recurring meeting times that meet the organizers defined thresholds.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to provide customized reminders for calendar items.

Figure 1:
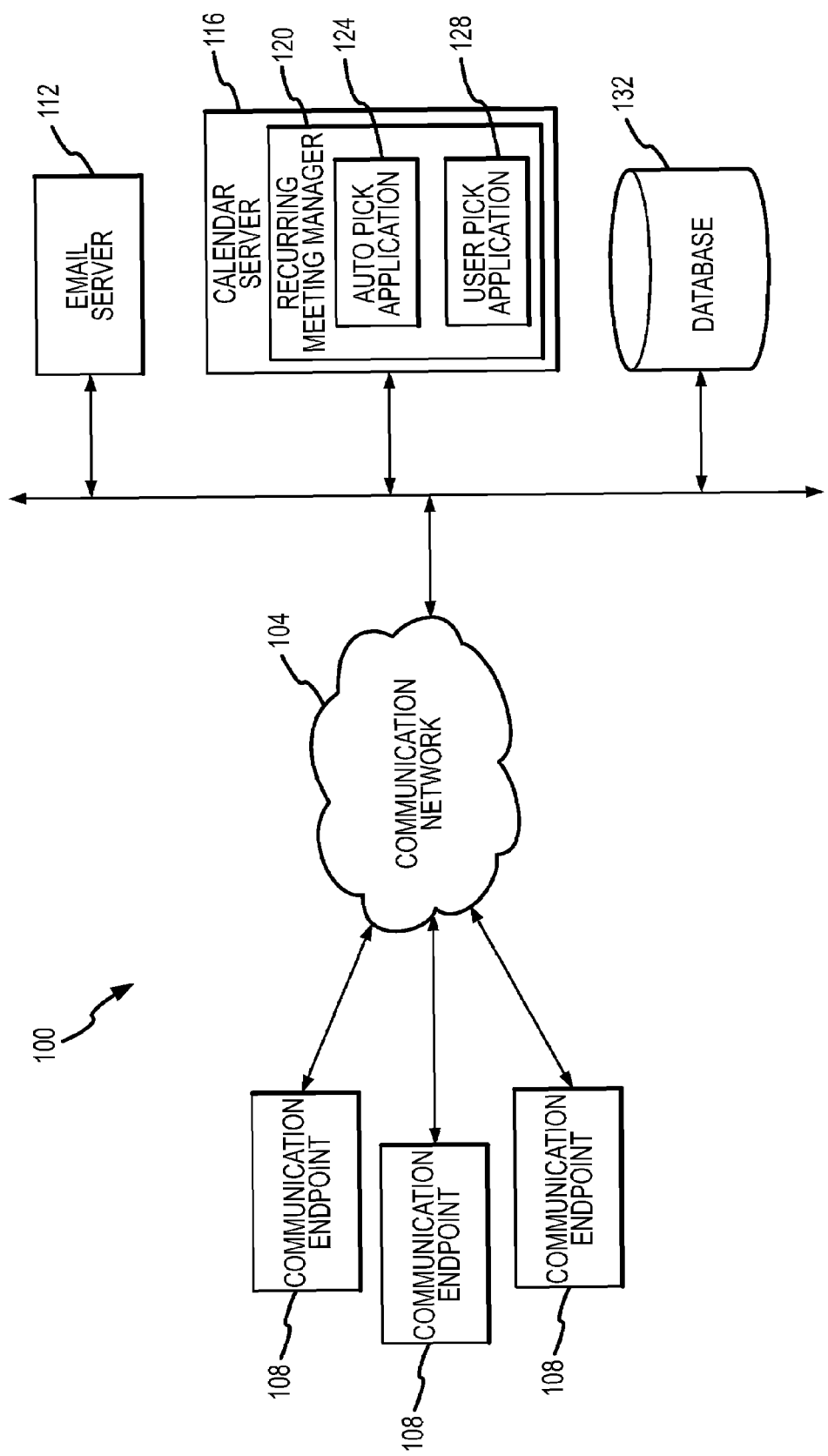
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication endpoints 108, an email server 112, a calendar server 116 having a recurring meeting manager 120 that further includes an auto pick application 124 and a user pick application 128, and a database 132.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN) like the Internet, and any other type of packet-switched or circuit-switched network known in the art. In addition, it can be appreciated that the communication network 104 need not be limited to any one network type, and instead may be comprised of a number of different networks and/or network types.

The communication endpoints 108 may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones.

A server 112, 116, in accordance with embodiments of the present invention, may comprise a communication server or other dedicated processor that functions to provide services to client devices (e.g., communication endpoints 108). The electronic mail (email) server 112, in one embodiment, provides email capabilities to users of the communication endpoints 108. By accessing the email server 112, the communication endpoint 108 can view email that has been sent to a particular user associated with the communication endpoint 108.

The calendar server 116 may work in conjunction with the email server 112 to provide scheduling and resource management capabilities to the communication devices 108. The email server 112 may access applications on the calendar server, like those found in the recurring meeting manager 120, to perform recurring meeting scheduling functions and to provide reminders to users via email. For example, a calendar service may be provided via an email application stored on the email server 112. Information related to the calendar service may be retrieved from the calendar server 116 and presented to the user through an email and/or calendar application. In one embodiment, meeting invitations may be generated by one user and transmitted to various other users of the communication endpoints 108 via email. Often a meeting relates to a user's time commitment and/or obligations such as tasks, actual meetings, events, and so on. In one embodiment, the recurring meeting manager 120 is operable to schedule recurring meetings between users of the communication endpoint 108 by referencing each user schedule. The schedule may be stored in the database 132 or in a portion of memory on the calendar server 116. By referencing each user schedule, the recurring meeting manager 120 can determine possible times for the recurring meeting. The results of the analysis of the user schedules may be provided to the originating user via one or both of the auto pick application 124 and user pick application 128. The auto pick application 124 is operable to select possible recurring meeting times and/or provide the user with suggestions for possible recurring meeting times. On the other hand, the user pick application 128 is operable to generate availability statistics for participants being invited to the recurring meeting and provide a visual, graphical, and/or audio representation of those statistics to the originating user. The user can then employ the availability statistics to decide on a recurring meeting time. As noted above, once a recurring meeting time is determined, the recurring meeting manager 120 may send invitations to the invited participants via the email server 112, for example.

As can be appreciated by one of skill in the art, the auto pick application 124 and user pick application 128 may be either localized or distributed in nature. In other words, the applications may reside in a distributed fashion on each communication endpoint 108 and may be executed by the communication endpoint 108. Alternatively, the applications may be stored locally on a server and can be pulled from the server by the communication endpoint 108 for execution thereon.

The database 132 may include any data storage medium capable of maintaining data related to users of the communication endpoints 108, calendar items, or other important information. The database 132 may include one or more magnetic storage devices, optical storage devices, solid state storage devices, or the like.

The term "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

It should be emphasized that the configuration of the servers 112, 116, user communication endpoints 108, and other elements as shown in FIG. 1 is for purposes of illustration only and should not be construed as limiting the invention to any particular arrangement of elements.

Figure 2:
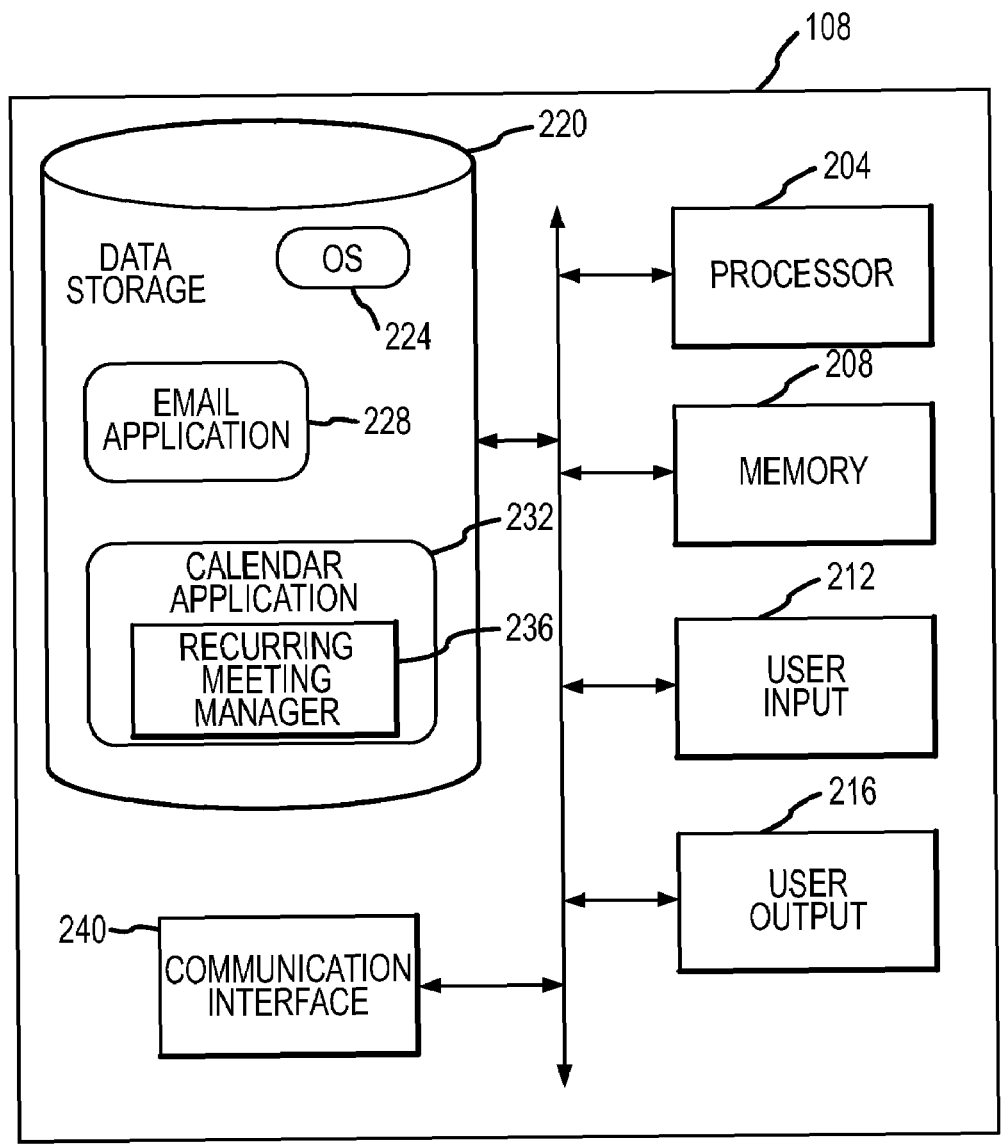
FIG. 2 is a block diagram depicting an exemplary communication endpoint in accordance with embodiments of the present invention.

With reference now to FIG. 2, components of a communication endpoint 108, like a communications or computing device, are depicted in block diagram form in accordance with embodiments of the present invention. The components may include a processor 204 capable of executing program instructions. Accordingly, the processor 204 may include any general purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication endpoint 108.

A communication endpoint 108 may additionally include memory 208 for use in connection with the execution of programming by the processor 204 and for the temporary or long term storage of data or program instructions. The memory 208 may comprise solid state memory resident, removable or remote in nature, such as DRAM and SDRAM. Where the processor 204 comprises a controller, the memory 208 may be integral to the processor 204.

In addition, the communication endpoint 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication endpoint 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

Examples of other applications that may be stored in the data storage 220 include an email application 228 that allows the user of the endpoint 108 to view, access, and manipulate data on the email server 112. For example, the email application 228 may provide a user friendly interface that presents data from the email server 112 to the user in an logical fashion, allows the user to create emails for transmission to other users associated with the communication system 100 and further respond to and/or forward emails received from other users. The email application 228 may further allow the user to send calendar items to other users requesting their participation with the calendar item.

Another application that may reside in data storage 220 is a calendar application 232. The calendar application 232 may maintain a personal event calendar and resource availability chart for a user associated with the endpoint 108. The calendar application 232 may be used to view upcoming events or tasks for a particular person or group of people. The email application 228 and calendar application 232 may work cooperatively to schedule calendar items via email with other users of the network 100.

A recurring meeting manager 236 may further be included as part of the calendar application. The recurring meeting manager 236 may be operable to analyze a number of schedules for potential invitees to a particular recurring meeting. The analysis of schedules, specifically long-term schedules, allows the recurring meeting manager 236 to schedule recurring meetings that will be most convenient for all participants based on their published schedule. The recurring meeting manager 236 can generate participant availability statistics for various recurring meeting times. These availability statistics can also be provided to a user to assist in the scheduling of a recurring meeting. Although not depicted, the recurring meeting manager 236 may comprise functionality similar to the auto pick application 124 and user pick application 128 described above.

The data storage 220 may also contain application programming and data used in connection with the performance of other functions of the communication endpoint 108. For example, in connection with a communication endpoint 108 such as a telephone or IP telephone, the data storage 220 may include communication application software. As another example, a communication endpoint 108 such as a Personal Digital Assistant (PDA) or a general purpose computer may include a word processing application in the data storage 220.

A communication endpoint 108 may also include one or more communication network interfaces 240. Examples of communication network interfaces 240 include, but are not limited to, a network interface card, a modem, a wired telephony port, a serial or parallel data port, radio frequency broadcast receiver or other wired or wireless communication network interfaces.

Figure 3:
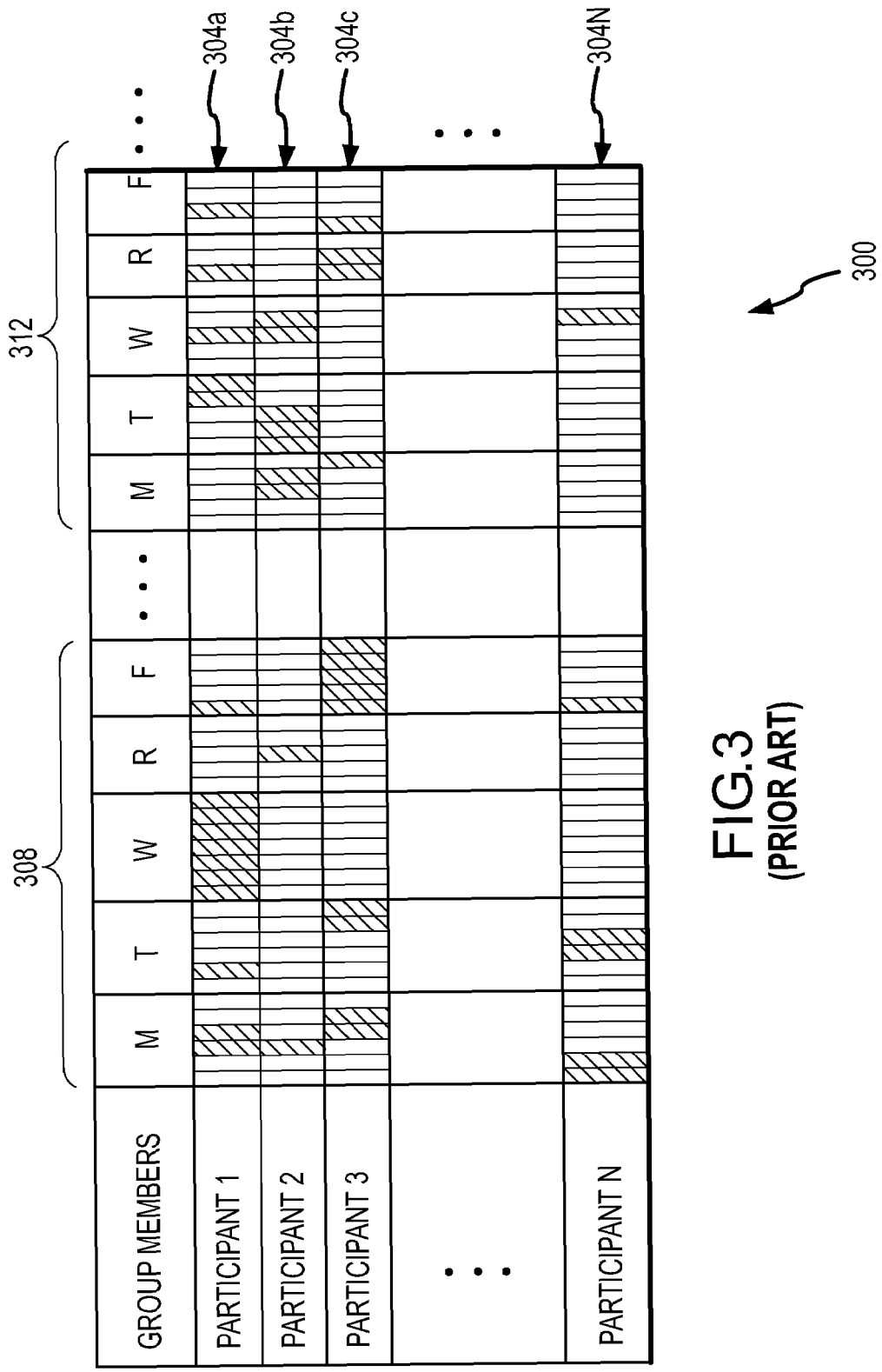
FIG. 3 is a screen shot of a calendar application depicting participant schedules in accordance with embodiments of the prior art.

Referring now to FIG. 3, a screen shot 300 of a calendar application in accordance with embodiments of the prior art will be described. The screen shot 300 depicted shows a list of group participants and their associated schedules 304*a*-N. The depicted participants may be potential invitees to a recurring meeting and/or an originator of the recurring meeting. The originator of a recurring meeting in the past has been required to view the schedules of each invitee as is displayed in FIG. 3. Specifically, a first week 308 or other time period (e.g., day, month, year, and so on) is depicted for each participant. The following week 312 is depicted after the first week. Additional weeks can further be depicted, typically in chronological order. One problem with displaying each time period in succession is that the display screen size cannot properly accommodate for a large number of time periods. In other words, it is difficult, if not impossible, for a user to view every time period of his/her schedule to accurately determine if he/she can schedule a recurring meeting. The situation becomes even more complicated when the user is trying to view schedules of other participants. Regardless of screen size, the user will not be able to view all of the data at the same time.

Each participant's schedule was typically displayed directly above or directly below another participant's schedule. This orientation of schedules allows an originator to scan down each schedule at a particular meeting time that he/she would like to suggest as a first meeting time for a recurring meeting. If the originator found a time where all participants were available, for instance the last time period on Monday in the first week 308, then the originator could look at the second week 312 to see if the same time was available.

However, as can be seen in the example depicted in FIG. 3, the initially chosen meeting time will not work for all participants as a recurring meeting time. Specifically, the third participant is marked as unavailable for the last time period on Monday in the second week 312. Thus, the originator would have to go back to the first week 308 to pick another possible recurring meeting time. If the recurring meeting is supposed to occur every week for the next year, then it will likely take a long time for the originator to pick a recurring meeting time. The process of picking a recurring meeting time can be made particularly difficult when a participant's schedule for the entire duration of the recurring meeting cannot be displayed all at once.

The display of a user's schedule in accordance with embodiments of the present invention is typically implemented according to default parameters. For example, a week is partitioned into days, and each day is partitioned into half-hour segments. Regardless of the intended duration of any one meeting or the duration of each meeting in a number of recurring meetings, a day is partitioned and displayed to the user according to default settings. This can be very problematic, especially when trying to schedule a recurring meeting where each meeting will have a duration greater than the default granularity.

Figure 4:
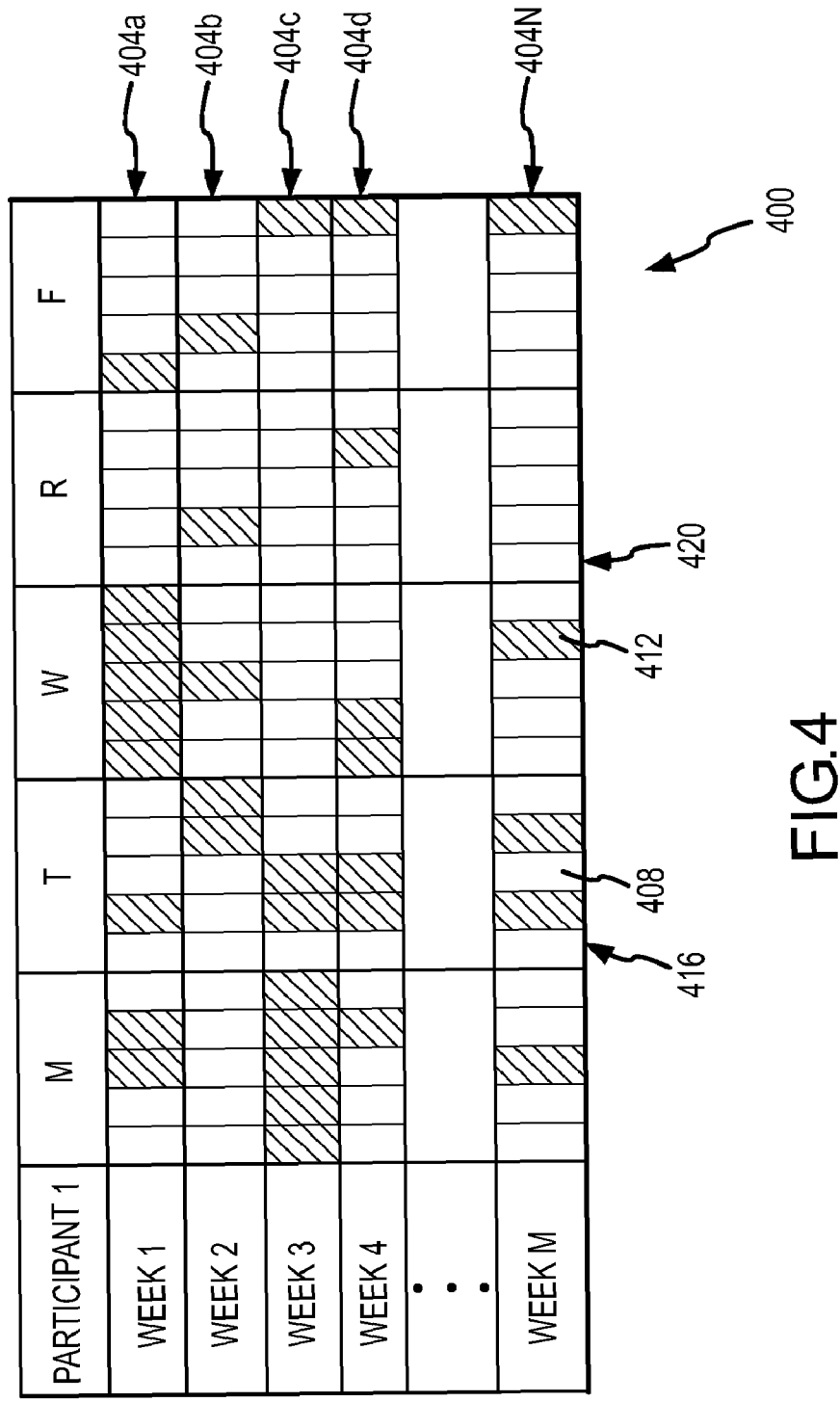
FIG. 4 is a screen shot of a calendar application depicting a participant's long-term schedule in accordance with embodiments of the present invention.

With reference now to FIG. 4, a screen shot of a particular participant's long-term schedule 400 will be described in accordance with embodiments of the present invention. The participant's schedule 400 is oriented with common time periods 404a-N (e.g., a week) stacked on one another. The time periods 404a-N may be partitioned according to default settings, but in a preferred embodiment the time periods 404a-N are partitioned according to the duration of each meeting in the recurring meeting. In other words, if the meeting is scheduled to last for two hours once a week, then the days may be partitioned by partially overlapping two hour intervals. Viewing a participant's schedule 400 this way allows an originator or recurring meeting manager 120, 236 to quickly scan potential meeting times within a participant's schedule 400 to more quickly see what times will work for a recurring meeting. More specifically, a participant's schedule may have some meeting times open, as indicated by the open time space 408, and other meeting times closed, as indicated by the closed time space 412. Therefore, the originator or recurring meeting manager 120, 236 can quickly scan for a column of open times for this participant. The first recurring meeting open time 416 for a participant may be noted as a potential time for the recurring meeting. The second recurring meeting open time 420 for the participant may be noted as another potential time for the recurring meeting.

As can be appreciated by one skilled in the art, the time periods that are stacked above one another do not necessarily need to correspond to a week. In fact, the way in which time periods are stacked generally depends upon the desired periodicity of the recurring meeting. For example, if a monthly recurring meeting is desired, then monthly time intervals should be stacked above one another for a given participant. Likewise, if a bi-weekly recurring meeting is desired, then two-week intervals should be stacked above one another. Moreover, the granularity of potential meeting times may be larger or smaller than is depicted in FIG. 4. The granularity of potential meeting times may vary based upon the desired duration of each meeting in the recurring meeting. As an example, if the duration of the meeting is intended to last only an hour, then the granularity of each time period marked as available or unavailable should be relatively close to an hour. If the recurring meeting is to last an entire day, then the granularity of the time period marked as available or unavailable can be as large as an entire day.

When one or more recurring meeting times are chosen for a particular participant based on that participant's availability schedule 400, then the originator or recurring meeting manager 120, 236 can compare those possible recurring meeting times with the schedule of the next participant. If any common available times are identified between all participants then those times may be possibilities for a recurring meeting time. As can be appreciated, a person may be identified as available for a meeting time even if that person will not be available for the entire meeting. In other words, a threshold may be used to define a person as available if they can make a significant portion of the meeting but not all of the meeting.

Figure 5:
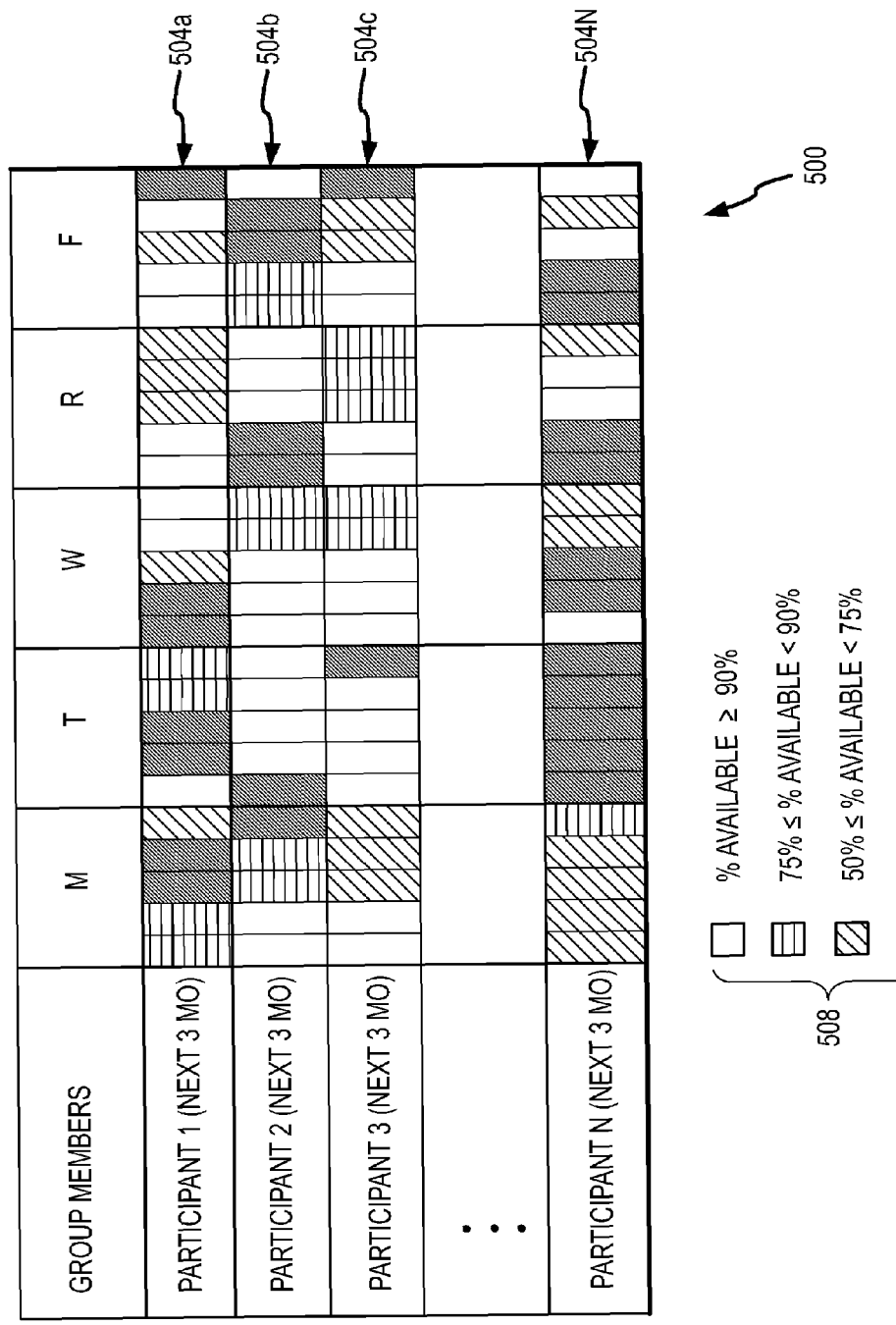
FIG. 5 is a screen shot of a calendar application depicting a number of participants' long-term schedules in accordance with embodiments of the present invention.

Referring now to FIG. 5, a summary screen shot of all participants' total availability for a recurring meeting 500 will be described in accordance with embodiments of the present invention. There may be very few times, if any, when all participants are completely available for every meeting in a recurring meeting. Especially when the recurring meeting spans a relatively long amount of time, the likelihood that a participant will not be able to attend one or more meetings increases. Thus, the originator or recurring meeting manager 120, 236 may need to schedule the recurring meeting for times when most participants will be available or all participants will be mostly available. To this end, the recurring meeting manager 120, 236 can generate availability statistics for each participant (invitees and originator) of the recurring meeting. Specifically, the recurring meeting manager 120, 236 can analyze each participant's schedule over the total duration of the recurring meeting (e.g., three months) to determine how often that participant will be available for a particular recurring meeting time over the course of the recurring meeting. The recurring meeting manager 120, 236 can also generate a condensed participant schedule 504 for each participant. The first condensed participant schedule 504a corresponds to the first participant's availability statistics for the duration of the recurring meeting. The second condensed participant schedule 504b corresponds to the second participant's availability statistics over the same duration, and so on for up to the Nth participant.

A key 508 may be provided as part of the screen shot 500. The key 508 helps display and differentiates each participant's total availabilities over the course of the recurring meeting. A participant's total availability for a specific recurring meeting time is determined by dividing the number of meetings the participant is available to attend by the total number of meetings in the recurring meeting. If there are 10 meetings in the recurring meeting and a participant is scheduled as available for 8 of those 10 meetings, then the total participant availability for that particular recurring meeting time will be 80%.

As can be seen in FIG. 5 if a time slot in a participant's schedule 504 is blank or white, then the participant's availability is greater than or equal to 90% for that meeting time over the duration of the recurring meeting, which is the next three months in this example. The horizontal lines correspond to a slightly lower level of availability and diagonal lines correspond to a lower level of availability still. Any type of differentiation between various ranges of total participant availability can be used. For example, colors or bar graphs may be used to differentiate a participant's availability for the meeting time over the duration of the recurring meeting. Alternatively, the actual values of availability may be written in each time period of a participant's condensed schedule 504.

As can be seen the stacking of each participant's condensed schedule 504 may be based upon the periodicity of the recurring meeting. In one embodiment, the recurring meeting manager 120, 236 is operable to account for participants being in different time zones. In other words, the condensed schedule 504 of a participant may be adjusted to a standard time (e.g., Greenwich Mean Time) before they are stacked on each other. This way the condensed schedules 504 are being compared on similar terms. Additionally, the recurring meeting manager 120, 236 may be able to account for participants that have multiple schedules. Under such a situation the recurring meeting manager 120, 236 may generate separate condensed schedules 504 for each schedule of the participant or may combine the schedules into a single condensed schedule 504 representing the participant's total availability.

Figure 6:
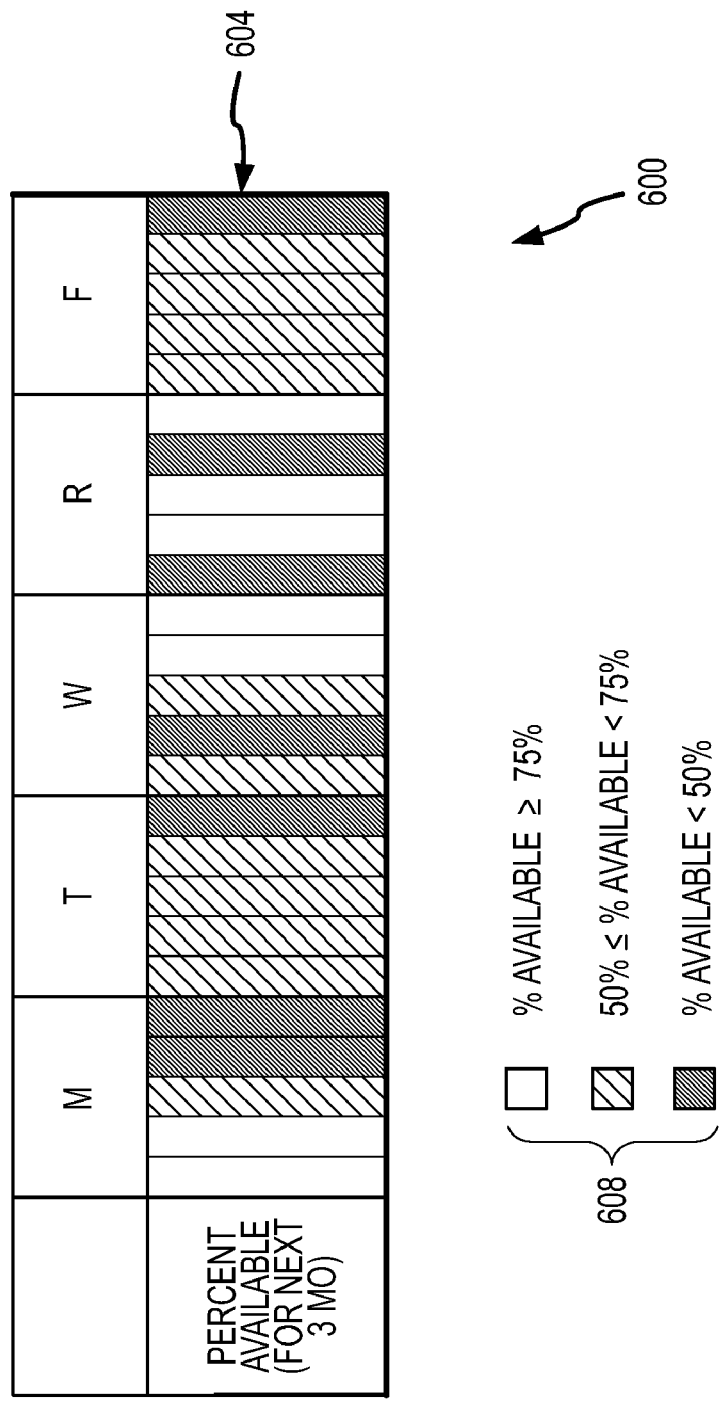
FIG. 6 is a screen shot of a calendar application depicting a representation of participant availability for recurring meeting times in accordance with embodiments of the present invention.

FIG. 6 depicts a screen shot of a further condensed availability schedule for all participants 600 over the duration of the recurring meeting. The total availability of all participants can be represented in a total availability field 604. The total availability field 604 can be read with the assistance of a key 608 similar to the key 504 described above. The total availability field 604 displays a total percent availability for all participants at any given time slot over the duration of the recurring meeting. Total participant availability for a recurring meeting time can be determined based on the accumulation of statistics for each participant's availability for the recurring meeting time. Total participant availability for a recurring meeting may be determined by dividing the total number of scheduled availabilities for all of the recurring meetings by the total number of participants invited to all of the recurring meetings. Of course, other approaches may be employed to calculate participant availability for a meeting, participant availability for a number of meetings in a recurring meeting, or a group of participants' availability for a number of meetings. Based on information provided in this screen, multiple candidate recurring meeting times can be determined based on their relative availabilities. More likely, however, recurring meeting times can be eliminated based on the total availability of participants.

Since a participant's total availability over the duration of a recurring meeting is represented through an availability statistic the originator or recurring meeting manager 120, 236 can easily see what dates and times will likely work for a recurring meeting. If a time slot is found where all participants are highly available over the duration of the recurring meeting, then a recurring meeting can likely be scheduled immediately. However, there may be other time slots that have an equal amount of availability. Based on this fact the originator or recurring meeting manager 120, 236 may wish to drill down into meeting time or participant details to determine which time slot best meets the unique needs of the recurring meeting. By selecting a potential recurring meeting time in one of the condensed schedules, the long-term schedule 400 for a participant or a variation thereof may be provided to the originator to assist in making a decision on the recurring meeting time.

Figure 7:
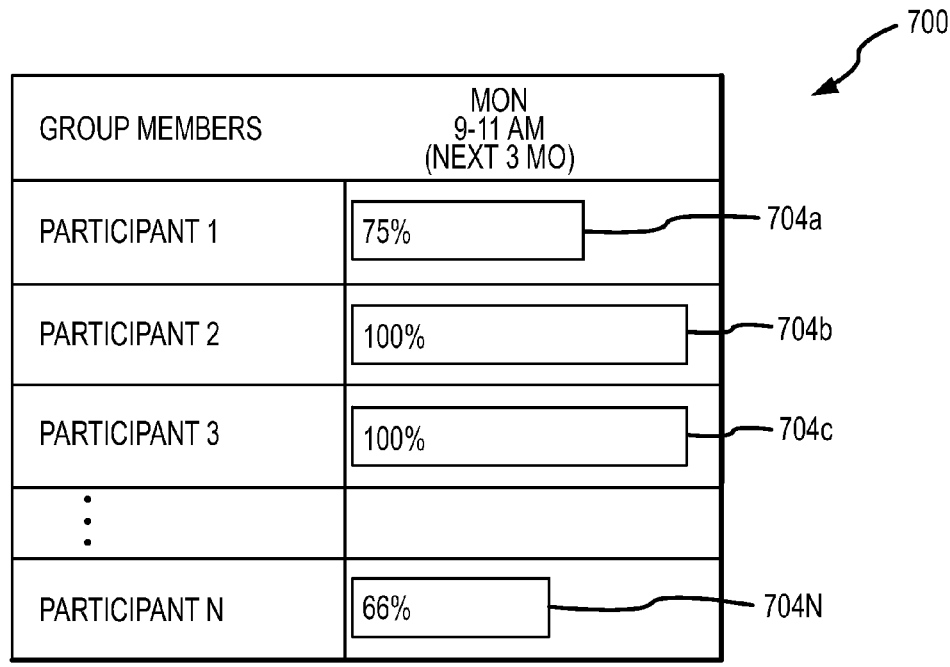
FIG. 7 is a screen shot of a calendar application depicting an alternative representation of participant availability in accordance with embodiments of the present invention.
Figure 8:
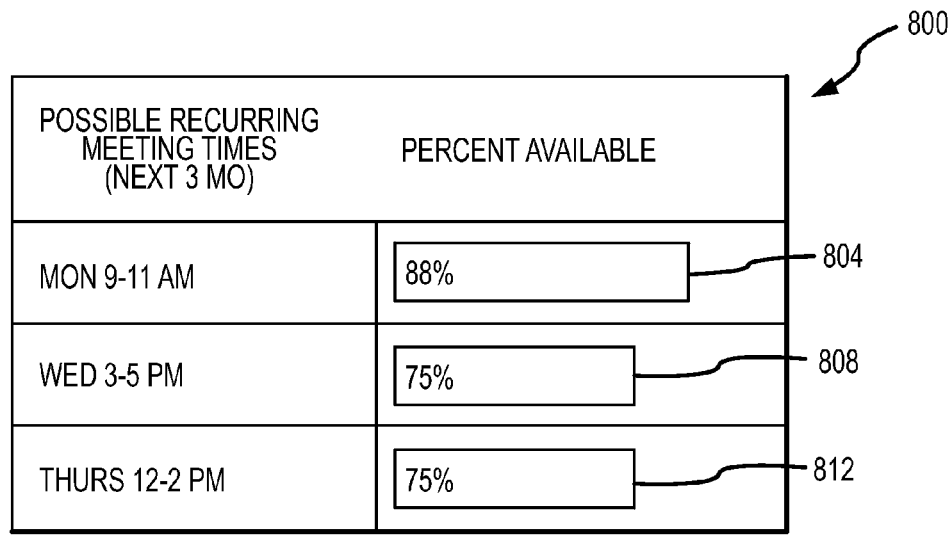
FIG. 8 is a screen shot of a calendar application depicting a combined availability of participants for a particular recurring meeting date in accordance with embodiments of the present invention.

Referring now to FIGS. 7 and 8 statistics reports 700, 800 will be described in accordance with at least some embodiments of the present invention. Statistics reports, like other schedules and reports, can be accessed from any other screen discussed herein. For example, an originator can be viewing a participant's long-term schedule 400, the all participants availability schedule 500, and/or the condensed availability schedule 600 then decide that more information will be needed to determine when a recurring meeting should be scheduled. More specifically, the originator may be interested in knowing what the exact percent availability of each participant is for a certain date and time slot. The originator can access this particular information by clicking on the date and time slot of choice. Alternatively, this information may be provided to the originator by the recurring meeting manager 120, 236 when the recurring meeting manager 120, 236 determines that the subject date has the highest or one of the highest overall participant availabilities.

FIG. 7 shows a statistic report 700 for a particular day and meeting time with each participant's availability 704*a*-N. The statistic report 700 is essentially a more detailed and specific representation of information displayed in the screen shot of all participants' total availability for a recurring meeting 500. The total participant availability for the depicted recurring meeting time may have been the highest as compared to all other possible meeting times. Thus, the originator or recurring meeting manager 120, 236 may wish to determine if the meeting time is acceptable based on the participants that can attend the meeting. More specifically, if a participant is identified as important or required to attend each meeting, then the originator will likely want to ensure that the important participant is 100% available, or close to that, for the chosen recurring meeting time. If the important participant is not 100% available, then the originator can return back to the important participant's schedule 400 to see what recurring meeting time that participant cannot attend. If the important participant cannot make the very first meeting, then the originator may decide to choose another recurring meeting time. On the other hand, if the important participant cannot make the fifth meeting in the recurring meeting, then the originator may decide that it is still okay to choose the given recurring meeting time. Of course, the recurring meeting manager 120, 236 may also make such a determination based on importance criteria given to the recurring meeting manager 120, 236.

In one embodiment, thresholds for a particular recurring meeting can be initially set. Those initial thresholds may help determine the best possible recurring meeting time for all participants. However, there will likely be times when important participants or other participants of a certain class are not available for one meeting in the recurring meeting. Under these circumstances the initial thresholds may be relaxed for the one meeting that the important participant cannot attend. The relaxation of the threshold for the one day may provide for a different meeting time that works for just that day. In an alternative embodiment, the initial thresholds can be defined to allow a certain number of threshold relaxations for the recurring meeting. For example, if there are 10 meetings in a recurring meeting the initial threshold may say that the thresholds can be relaxed 2 times but the other 8 meetings must adhere to the thresholds. Then any meeting that would violate threshold except for the relaxation rule can be dealt with as an exception by the meeting organizer.

In accordance with at least some embodiments of the present invention, the idea of classes may be used as a part of the meeting requirements or thresholds. Very important participants, meaning that their attendance to the meeting is important, may be assigned to a first class of high importance. Somewhat important participants may be assigned to a second class of medium importance and the rest of the participants may be assigned to a third class of low importance. Each class may be given a designated weight and that weight can be used in determining an acceptable recurring meeting time. Moreover, the participants may be presented to the user according to the class they are assigned.

As can be seen in FIG. 7, the second and third participant are 100% available for the chosen recurring meeting time. The Nth participant is only 66% available for the chosen recurring meeting time. If the Nth participant does not have a high level of importance, then the decision may be made to move forward with the chosen recurring meeting time and the Nth participant will only be expected to attend when available.

FIG. 8 depicts a second statistical report 800 showing total availability for a recurring meeting. More specifically, the second statistical report 800 shows total availability statistics for potential recurring meeting times. A first potential recurring meeting time may have a first total availability 804. A second potential recurring meeting time may have a second total availability 808 and a third potential recurring meeting time may have a third total availability 812. Total availability can be computed by dividing the total number of participants available for all meetings in the recurring meeting time by the total number of participants invited to all meetings in the recurring meeting time.

As can be seen in the depicted example, one or more of the potential meeting times may have the same total availability. The potential recurring meeting times are displayed to an originator so that he/she may choose the best recurring meeting time. The originator may click on one of the potential recurring meeting times and be provided with the participant availability schedule 500. This allows the originator to choose the recurring meeting time with more detailed information than the total availability statistic provided by the second statistical report 800. In an alternative embodiment, the recurring meeting manager 120, 236 may automatically select one of the potential recurring meeting times based on total availability. In the event that the total availability for a first recurring meeting time greatly exceeds the total availability for any other potential recurring meeting time, then the first recurring meeting time may be chosen without the assistance of the originator. However, if more detailed information is desired when choosing a recurring meeting time, then a number of the other schedules and reports may be accessed through the second statistical report 800.

Figure 9:
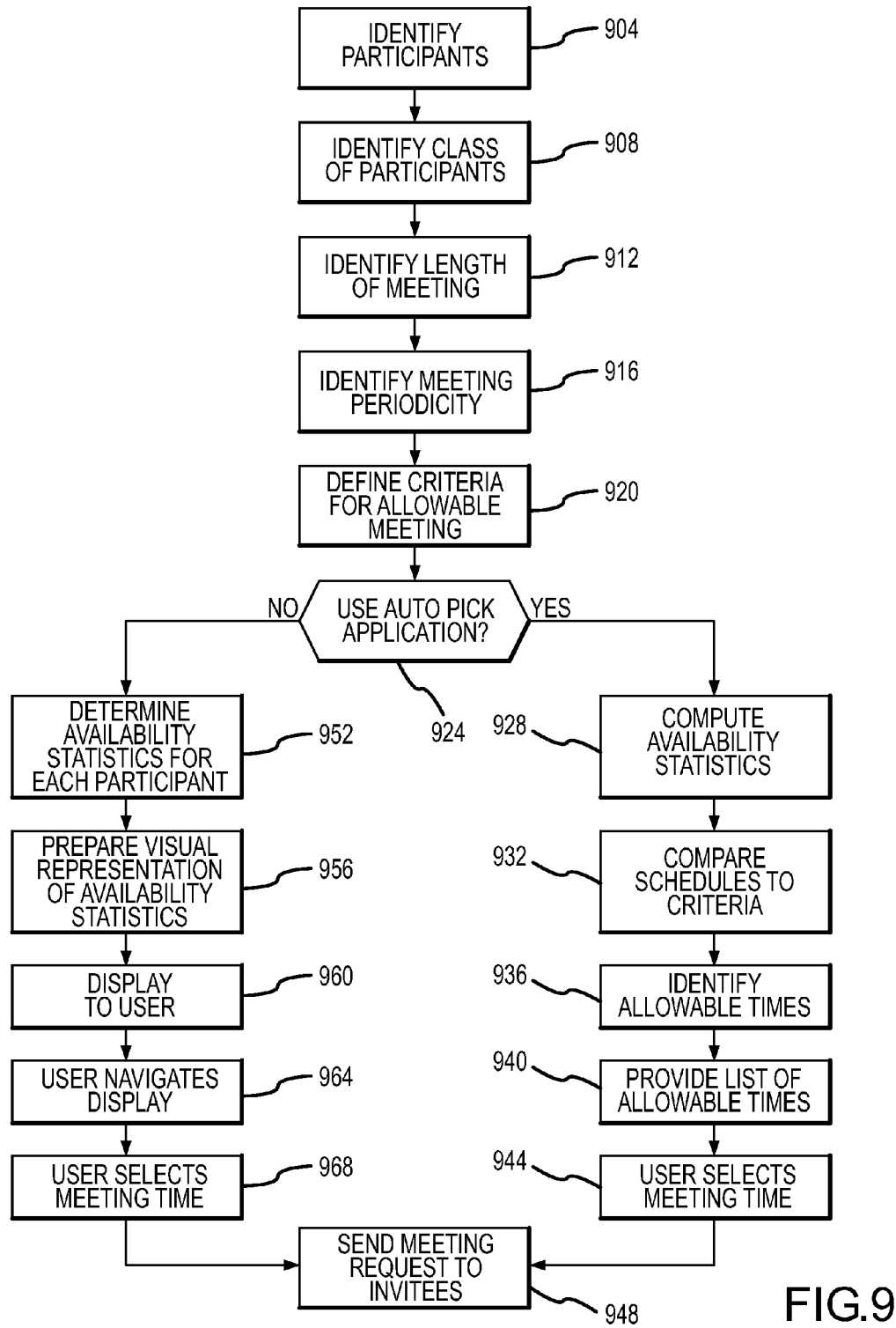
FIG. 9 is a flow chart depicting a method of scheduling a recurring meeting in accordance with embodiments of the present invention.

Referring now to FIG. 9, a method of scheduling a recurring meeting will be described in accordance with at least some embodiments of the present invention. Initially, the method begins when participants of a recurring meeting are identified (step 904). The participants include the originator as well as any invitees or named delegates of the invitees. In further embodiments, the participants may include non-human resources such as, for example, rooms, slide show equipment, and so on. The invitees may be individually chosen by the originator or may be part of a predefined group, such as a design team, board of directors, management, etc. After participants are identified the class or importance of the participants is identified (step 908). The importance of a participant relates to how important it is to have a given participant attend a meeting or set of meetings in the recurring meeting. If it is relatively important that a participant attends every meeting in the recurring meeting then the attendance importance of that participant will be relatively high. Participants who are not required to be at the recurring meeting may have a relatively lower attendance importance. The recurring meeting time may be chosen to accommodate the schedules of those participants that have a relatively high attendance importance while sacrificing the schedules of those participants with a lower attendance importance. As noted above, each class of participants may be given a particular weight signifying their importance of attending the meeting. This weight may be used in determining when a recurring meeting should occur. Alternatively, the classes may be organized and presented to the user according to their importance.

Once the attendance importance of the participants is identified, the desired length of the recurring meeting is identified (step 912). Both the duration of each meeting in the recurring meeting as well as the total interval for the recurring meeting can be defined in the length of a recurring meeting. For example, each meeting in the recurring meeting may be scheduled to last an hour in duration and the total interval of the recurring meeting may be defined to last for the next six months. These length parameters help determine how a participant's schedule will be analyzed as well as how availability statistics will be calculated.

Another factor that will be considered while analyzing participant's schedules will be meeting periodicity. In step 916, the desired meeting periodicity is identified for the recurring meeting. The periodicity of the meeting may be desired or predefined to be weekly, bi-weekly, monthly, yearly, or any other desired interval. The periodicity of the meeting along with the identified interval of the recurring meeting defines the number of meetings that are to be included in the recurring meeting. The periodicity of the meeting is preferably uniform, meaning that the meeting is preferably scheduled every period at the same time (e.g., every Wednesday at 9:00 am). However, in accordance with at least some embodiments of the present invention, the periodicity of the actual recurring meeting may vary slightly from the predefined periodicity. For example, if a recurring meeting is desired on a weekly basis, then weekly meetings may be scheduled for the same day but at different times on different days. A first meeting may occur at 9:00 am on the first Wednesday and a second meeting may be scheduled for 9:30 or 10:00 am on the following Wednesday. This flexibility may also be defined when the periodicity of the meeting is defined as a threshold or criteria. An originator can identify periodicity thresholds that allow the recurring meeting manager 120, 236 to slightly adjust the periodicity of the recurring meeting within the confines of the threshold. The periodicity thresholds may be defined as, for example, must occur on the same day every period, must occur at the same time, can occur one day earlier or later, can occur a certain number of hours earlier or later, can have one meeting canceled, can be moved if otherwise would fall on a holiday, etc. By providing bounds or thresholds that define when meetings in the recurring meeting can and cannot occur, the originator is telling the recurring meeting manager 120, 236 that scheduling liberties can be taken, but only to a certain extent. This flexibility may allow more participants, especially attendance important participants, to make more meetings in the recurring meeting.

After the periodicity of the recurring meeting has been defined, along with any periodicity thresholds, attendance criteria, which may also include attendance thresholds and exceptions, are defined for an allowable recurring meeting time (step 920). The criteria used to define an allowable recurring meeting time may vary depending upon the nature of the recurring meeting and the relative availability of the participants. The criteria defining an allowable recurring meeting time is typically expressed in terms of one or more availability statistics, such as those availability statistics described above. More specifically, availability statistics that define an allowable meeting may include, without limitation, total availability of each participant for all meetings in the recurring meeting (e.g., all participants need to be available for all meetings), percent availability for all participants for all meetings in the recurring meeting (e.g., total participant availability needs to be greater than 80% for the recurring meeting), percent availability of each participant for all meetings in the recurring meeting (e.g., participant A needs to be greater than 90% available and/or participant B needs to be greater than 75% available), percent of participants available for certain meetings in the recurring meeting (e.g., 100% availability for the first meeting then 80% availability for the rest), availability for each participant for certain meetings in the recurring meeting (e.g., participant A needs to be available for first and last meeting and/or participant B needs to be available for the first meeting).

Once the allowability criteria have been defined, it is determined whether the auto pick application 124 will choose candidate recurring meeting times (step 924). In the event that the auto pick application 124 will be employed then the availability statistics for each participant or for each possible recurring meeting time is determined (step 928). Thereafter, the schedules and/or availability statistics of each participant are compared to the allowability criteria (step 932). As can be appreciated, the total schedule of each participant may be compared to the allowability criteria if some criterion is dependent upon certain meetings. However, if the criteria only includes availability statistics, then the availability statistics for each participant can be computed and compared to the criteria rather than comparing the entire schedule. In other words, a condensed schedule of each participant can be compared to the criteria. Furthermore, a condensed schedule for all participants can be compared to the criteria if the restrictions on the recurring meetings are only defined by the total participant availability.

Based on the comparison of schedules to the criteria, the recurring meeting manager 120, 236 identifies allowable recurring meeting times (step 936). At this step, there may be a large number of allowable recurring meeting times in which case the recurring meeting manager 120, 236 may only select those recurring meeting times with the best availability statistics. Alternatively, the recurring meeting manager 120, 236 may select every allowable recurring meeting time. The recurring meeting manager 120, 236 then generates a list of the allowable recurring meeting times and provides the list to the meeting originator (step 940). The list provided to the originator may be organized such that those recurring meeting times with the highest availability statistics are at the top and recurring meeting times with lower availability statistics are below. The originator can then view different recurring meeting times and look at more detailed reports if he/she chooses. If there are any non-uniformities in the recurring meeting then they may be indicated to the originator and the originator can check the non-uniformities to see if they are acceptable. Then the originator selects a recurring meeting time that is suitable based on the participant's schedules and the availability statistics (step 944). The ranking of the possible recurring meeting times may allow an originator to choose a recurring meeting time more quickly. The list of possible recurring meeting times can vary based upon certain criteria such as best availability for all participants and best availability for most important participant. Once the originator has chosen the recurring meeting time, an invitation or meeting request is sent to the invitees of the recurring meeting (step 948).

Referring back to step 924, in the event that use of the user pick application is desired, then the recurring meeting manager 120, 236 determines availability statistics for each participant (step 952). Then one or more of the schedules or statistics reports are prepared (step 956). The representation of the statistics to the originator may be in the form of the participant availability schedule 500, since such a representation allows the originator to see relatively detailed information about each participant's schedule as well as some availability statistics. However, the initial report may be a condensed version of availability statistics. Once the recurring meeting manager 120, 236 has prepared the visual representation, the report or schedule is displayed to the originator (step 960). The originator can then navigate through various reports looking at overall availability statistics for certain recurring meeting times or a certain participant's long-term schedule (step 964). As the originator is navigating the reports and schedules he/she can begin to choose the most suitable recurring meeting time. Eventually, the originator selects a recurring meeting time that best suits the needs of the recurring meeting and its participants (step 968). After the recurring meeting time has been selected, a meeting request is sent to the invitees of the recurring meeting (step 948).

As noted above, the present invention can be used to schedule recurring meetings for a number of participants. In alternative embodiments, recurring tasks or to-do items can be scheduled for an individual. Further in the alternative, embodiments of the present invention can be used to schedule the allocation of various resources. More specifically, meeting rooms for a recurring meeting can be scheduled. The meeting room for a first meeting in the recurring meeting does not necessarily need to be the same as the room used in the second meeting in the recurring meeting.

Although recurring meeting times can be determined by analyzing a complete schedule of a participant as described above, a reduced schedule of each participant may be analyzed to accomplish a similar result. For example, only the recurring meetings of each participant may be analyzed to determine when to schedule a recurring meeting. Additionally, complete schedules can be analyzed for participants belonging to a higher importance class and reduced schedules can be analyzed for participants belonging to lower importance classes.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A computer-implemented method, comprising:
   identifying, by a recurring meeting manager residing on a server or communication endpoint, participants of a recurring meeting;
   receiving, from a user, input at the recurring meeting manager, the input indicating a user-desired periodicity of the recurring meeting, the user-desired periodicity comprising one or more of: a desired day of week, a desired week of month, a desired day of month, and a desired time of day;
   defining, by the recurring meeting manager, a minimum required availability criteria for the participants in association with the recurring meeting;
   determining, by the recurring meeting manager, an individual threshold for availability associated with each participant;
   determining, by the recurring meeting manager, an overall attendance threshold for the recurring meeting;
   analyzing, by the recurring meeting manager, a schedule of each participant included in the identified participants;

identifying, by the recurring meeting manager, at least a first occurrence in the recurring meeting and at least a second occurrence in the recurring meeting, wherein the at least a first occurrence and the at least a second occurrence satisfy the individual threshold of each participant and the overall attendance threshold, and wherein the at least a second occurrence differs from the user desired periodicity and also differs from the at least a first occurrence in one or more of: the desired day of week, the desired week of month, the desired day of month, and the desired time of day; and performing, by the recurring meeting manager, either of the following substeps:

(i) ranking, by the recurring meeting manager, the at least a first occurrence and the at least a second occurrence in a ranked list and then providing the ranked list to the user, wherein the user to selects at least one of the at least a first occurrence and the at least a second occurrence from the list; and (ii) selecting, by the recurring meeting manager, at least one of the at least a first occurrence and the at least a second occurrence, based on a predefined relative ranking of the at least a first occurrence and the at least a second occurrence; wherein the selected at least one of the at least a first occurrence and the selected at least a second occurrence have a first periodicity that is within a predetermined threshold of the user-desired periodicity, and wherein the first periodicity is non-uniform.

2. The method of claim 1, further comprising suggesting, via a user interface, the identified at least a first occurrence and the identified at a least second occurrence to an originator of the recurring meeting.

3. The method of claim 1, wherein the minimum required availability criteria is chosen from a group of criteria comprising at least one of the following:

total availability of each participant for all occurrences in the recurring meeting;

percent availability for all participants for all occurrences in the recurring meeting;

percent availability of each participant for all occurrences in the recurring meeting;

percent of participants available for the at least a first occurrence;

percent of participants available for the at least a second occurrence;

availability for each participant for the at least a first occurrence; and availability for each participant for the at least a second occurrence.

4. The method of claim 3, wherein percent availability of each participant for all occurrences in the recurring meeting is determined by dividing the number of times a participant is available for all of the occurrences by the number of occurrences in the recurring meeting.

5. The method of claim 1, further comprising:

determining availability statistics for each participant in association with the recurring meeting;

preparing a representation of the availability statistics for an originator of the recurring meeting; and displaying the representation of the availability statistics to the originator.

6. The method of claim 5, further comprising:

allowing the originator to choose a recurring meeting time;

receiving the choice of the recurring meeting time; and sending an invitation to all identified participants other than the originator to join the recurring meeting.

7. The method of claim 1, further comprising: identifying an importance of attending the recurring meeting for each participant; and ensuring that a participant with a required importance is available for the identified recurring meeting time.

8. The method of claim 7, wherein the importance for at least one participant included in the intended participants varies between the at least a first occurrence and the at least a second occurrence.

9. The method of claim 1, wherein the user-desired periodicity is non-uniform.

10. The method of claim 1, wherein (i) is selected.

11. The method of claim 1, wherein (ii) is selected.

12. A communications endpoint comprising a computer readable medium tangibly embodying executable instructions operable to perform, when executed by a processor, a method, the method comprising:

identifying participants of a recurring meeting; receiving, from a user, input at the recurring meeting manager, the input indicating a user-desired periodicity of the recurring meeting, the user-desired periodicity comprising one or more of: a desired day of week, a desired week of month, a desired day of month, and a desired time of day;

defining a minimum required availability criteria for the participants in association with the recurring meeting;

determining an individual threshold for availability associated with each participant;

determining an overall attendance threshold for the recurring meeting;

analyzing a schedule of each participant included in the identified participants;

identifying at least a first occurrence in the recurring meeting and at least a second occurrence in the recurring meeting, wherein the at least a first occurrence and the at least a second occurrence satisfy the individual threshold of each participant and the overall attendance threshold, and wherein the at least a second occurrence differs from the user desired periodicity and also differs from the at least a first occurrence in one or more of: the desired day of week, the desired week of month, the desired day of month, and the desired time of day; and causing one or more of the following substeps to be performed:

(i) ranking, by the recurring meeting manager, the at least a first occurrence and the at least a second occurrence in a ranked list and then providing the ranked list to the user, wherein the user selects at least one of the at least a first occurrence and the at least a second occurrence from the list; and (ii) selecting at least one of the at least a first occurrence and the at least a second occurrence, based on a predefined relative ranking of the at least a first occurrence and the at least a second occurrence; wherein the selected at least one of the at least a first occurrence and the selected at least a second occurrence have a first periodicity that is within a predetermined threshold of the user-desired periodicity, and wherein the first periodicity is non-uniform.

13. A system for managing schedules, comprising a processor to execute instructions and memory, the memory including a calendar application comprising a recurring meeting manager operable to:

identify participants of a recurring meeting, the recurring meeting comprising multiple occurrences;

determine a user-desired periodicity of the recurring meeting, the user-desired periodicity comprising one or more of: a desired day of week, a desired week of month, a desired day of month, and a desired time of day;

define a minimum required availability criteria for the participants in association with the recurring meeting;

determine an individual threshold for availability associated with each participant;

determine an overall attendance threshold for the recurring meeting;

analyze a schedule of each participant included in the identified participants;

identify at least a first occurrence in the recurring meeting and at least a second occurrence in the recurring meeting, wherein the at least a first occurrence and the at least a second occurrence satisfy the individual threshold of each participant and the overall attendance threshold, and wherein the at least a second occurrence differs from the user desired periodicity and also differs from the at least a first occurrence in one or more of: the desired day of week, the desired week of month, the desired day of month, and the desired time of day; and cause one or more of the following substeps to be performed:
(i) rank the at least a first occurrence and the at least a second occurrence in a ranked list and then providing the ranked list to the user, wherein the user selects at least one of the at least a first occurrence and the at least a second occurrence from the list; and
(ii) select at least one of the at least a first occurrence and the at least a second occurrence, based on a predefined relative ranking of the at least a first occurrence and the at least a second occurrence;

wherein the selected at least one of the at least a first occurrence and the selected at least a second occurrence have a first periodicity that is within a predetermined threshold of the user-desired periodicity, and wherein the first periodicity is non-uniform.

14. The system of claim 13, further comprising a server and wherein the calendar application is at least partially implemented by the server.

15. The system of claim 13, further comprising a communication endpoint and wherein the calendar application is at least partially implemented by the communication endpoint.

16. The system of claim 13, wherein the recurring meeting comprises at least a first and second occurrence, and wherein the minimum required availability criteria is selected from a group of criteria comprising at least one of the following:
total availability of each participant for all occurrences in the recurring meeting;
percent availability for all participants for all occurrences in the recurring meeting;
percent availability of each participant for all occurrences in the recurring meeting;
percent of participants available for the at least a first occurrence;
percent of participants available for the at least a second occurrence;
availability for each participant for the at least a first occurrence; and
availability for each participant for the at least a second occurrence.

17. The system of claim 16, wherein percent availability of each participant for all occurrences in the recurring meeting is determined by dividing the number of times a participant is available for all occurrences in the recurring meeting by the number of occurrences in the recurring meeting.

18. The system of claim 16, wherein percent availability for all participants for all occurrences in the recurring meeting is determined by dividing the number of participants available for all of the occurrences by the total number of participants invited to all occurrences in the recurring meeting.

19. The system of claim 13, wherein the recurring meeting manager is further operable to determine availability statistics for each participant in association with the recurring meeting, prepare a representation of the availability statistics for an originator of the recurring meeting, and display the representation of the availability statistics to the originator.

20. The system of claim 19, wherein the recurring meeting manager is further operable to allow the originator to choose a recurring meeting time, receive the choice of the recurring meeting time, and send an invitation to all identified participants other than the originator to join the recurring meeting.

21. The system of claim 19, wherein the recurring meeting manager is further operable to identify an importance of attending the recurring meeting for each participant, and pick a recurring meeting time such that a participant with a required importance is available for the identified recurring meeting time.

22. The system of claim 21, wherein the recurring meeting comprises at least a first and second occurrence, and wherein the importance for at least one participant included in the intended participants varies between the at least a first occurrence and the at least a second occurrence.

23. The system of claim 13, wherein the user-desired periodicity is non-uniform.

* * * * *